US010208555B2

(12) United States Patent
Gottlieb et al.

(10) Patent No.: US 10,208,555 B2
(45) Date of Patent: Feb. 19, 2019

(54) BLOWOUT PREVENTER MONITORING SYSTEMS AND METHODS

(71) Applicant: Cameron International Corporation, Houston, TX (US)

(72) Inventors: Emanuel John Gottlieb, Upper St. Clair, PA (US); Salvador Reyes, III, Houston, TX (US); Edward Gaude, Tomball, TX (US)

(73) Assignee: Cameron International Corporation, Houston, TX (US)

( * ) Notice: Subject to any disclaimer, the term of this patent is extended or adjusted under 35 U.S.C. 154(b) by 100 days.

(21) Appl. No.: 15/277,852

(22) Filed: Sep. 27, 2016

(65) Prior Publication Data

US 2018/0087342 A1    Mar. 29, 2018

(51) Int. Cl.
| | |
|---|---|
| *E21B 33/06* | (2006.01) |
| *E21B 47/00* | (2012.01) |
| *F16K 37/00* | (2006.01) |
| *G01S 15/02* | (2006.01) |
| *E21B 47/09* | (2012.01) |
| *G01S 15/10* | (2006.01) |
| *G01S 15/88* | (2006.01) |

(52) U.S. Cl.
CPC .......... *E21B 33/062* (2013.01); *E21B 47/091* (2013.01); *G01S 15/10* (2013.01); *G01S 15/88* (2013.01)

(58) Field of Classification Search
CPC ...... E21B 33/062; E21B 47/00; E21B 33/064; F16K 37/0066; G01S 15/02
USPC .......................................................... 73/597
See application file for complete search history.

(56) References Cited

U.S. PATENT DOCUMENTS

| | | |
|---|---|---|
| 3,855,847 A | 12/1974 | Leschek |
| 3,858,439 A | 1/1975 | Nakamura |
| (Continued) | | |

FOREIGN PATENT DOCUMENTS

| | | | |
|---|---|---|---|
| DE | 102012007219 A1 | 10/2013 | |
| WO | WO-2005003571 A1 * | 1/2005 | ............... G01D 5/48 |

OTHER PUBLICATIONS

Translation WO-2005003571 (Year: 2005).*
U.S. Appl. No. 15/431,262, filed Feb. 13, 2017, Andrew Jaffrey.
U.S. Appl. No. 14/851,541, filed Sep. 11, 2015, Andrew Jaffrey.

*Primary Examiner* — Natalie Huls
*Assistant Examiner* — Monica S Young
(74) *Attorney, Agent, or Firm* — Helene Raybaud

(57) ABSTRACT

A monitoring system for a blowout preventer (BOP) includes an ultrasonic transceiver configured to be coupled to a body that supports a movable component of the BOP. The system also includes a reflector configured to be positioned within a channel formed in the body. The ultrasonic transceiver is configured to emit an acoustic wave and the reflector is configured to reflect the acoustic wave to facilitate transmission of the acoustic wave from the ultrasonic transceiver to the movable component of the BOP and to facilitate transmission of a reflected acoustic wave from the movable component to the ultrasonic transceiver to enable the ultrasonic transceiver to generate a first signal indicative of a position of the movable component. The system further includes a controller configured to receive the first signal from the ultrasonic transceiver and to determine the position of the movable component based on the first signal.

17 Claims, 9 Drawing Sheets

(56) References Cited

U.S. PATENT DOCUMENTS

| | | |
|---|---|---|
| 3,985,024 A | 10/1976 | Horak |
| 4,009,463 A | 2/1977 | Vercellotti et al. |
| 4,033,179 A | 7/1977 | Romrell |
| 4,188,830 A | 2/1980 | Mason et al. |
| 4,297,885 A | 11/1981 | Hein, Jr. et al. |
| 4,731,744 A | 3/1988 | Harrell, Jr. et al. |
| 4,922,423 A | 5/1990 | Koomey et al. |
| 5,014,761 A | 5/1991 | Smith |
| 5,407,172 A | 4/1995 | Young et al. |
| 6,478,087 B2 | 11/2002 | Allen |
| 7,234,490 B2 | 6/2007 | Dorr |
| 7,832,706 B2 | 11/2010 | Judge |
| 8,413,716 B2 | 4/2013 | Judge et al. |
| 8,464,752 B2 | 6/2013 | Dietz et al. |
| 8,978,698 B2 | 3/2015 | Liotta et al. |
| 9,163,471 B2 | 10/2015 | Coonrod et al. |
| 9,187,974 B2 | 11/2015 | Coonrod et al. |
| 2005/0284217 A1* | 12/2005 | Miyagawa ......... G01F 23/2962 73/290 V |
| 2008/0040070 A1 | 2/2008 | McClanahan |
| 2012/0000646 A1* | 1/2012 | Liotta ................ E21B 33/062 166/85.4 |
| 2013/0283919 A1* | 10/2013 | Coonrod ............ E21B 33/0355 73/632 |
| 2014/0352426 A1* | 12/2014 | Kuehnel ............ G01F 23/2968 73/290 V |
| 2015/0007651 A1 | 1/2015 | Reyes, III et al. |

\* cited by examiner

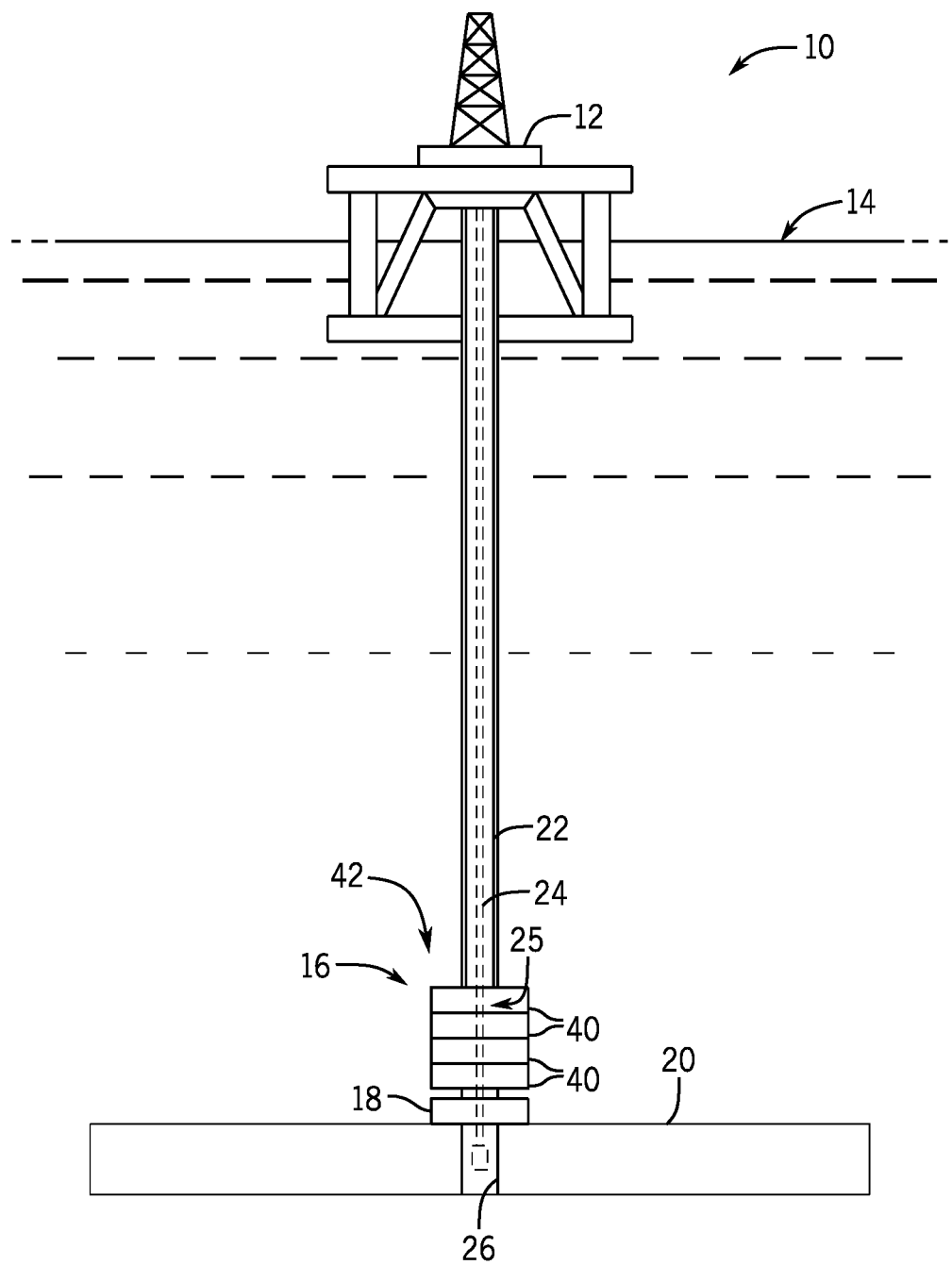
FIG. 1
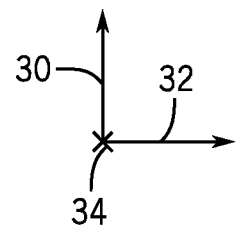

BLOWOUT PREVENTER MONITORING SYSTEMS AND METHODS

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A blowout preventer (BOP) stack is installed on a wellhead to seal and control an oil and gas well during drilling operations. A drill string may be suspended inside a drilling riser from a rig through the BOP stack into the well bore. During drilling operations, a drilling fluid is delivered through the drill string and returned up through an annulus between the drill string and a casing that lines the well bore. In the event of a rapid invasion of formation fluid in the annulus, commonly known as a "kick," a movable component within the BOP stack may be actuated to seal the annulus and to control fluid pressure in the wellbore, thereby protecting well equipment disposed above the BOP stack. It would be desirable to monitor a position of the movable component within the BOP stack.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 is a schematic diagram of an offshore system having a monitoring system configured to monitor a position of a movable component of a BOP, in accordance with an embodiment of the present disclosure;

DETAILED DESCRIPTION OF SPECIFIC EMBODIMENTS

Figure 2:
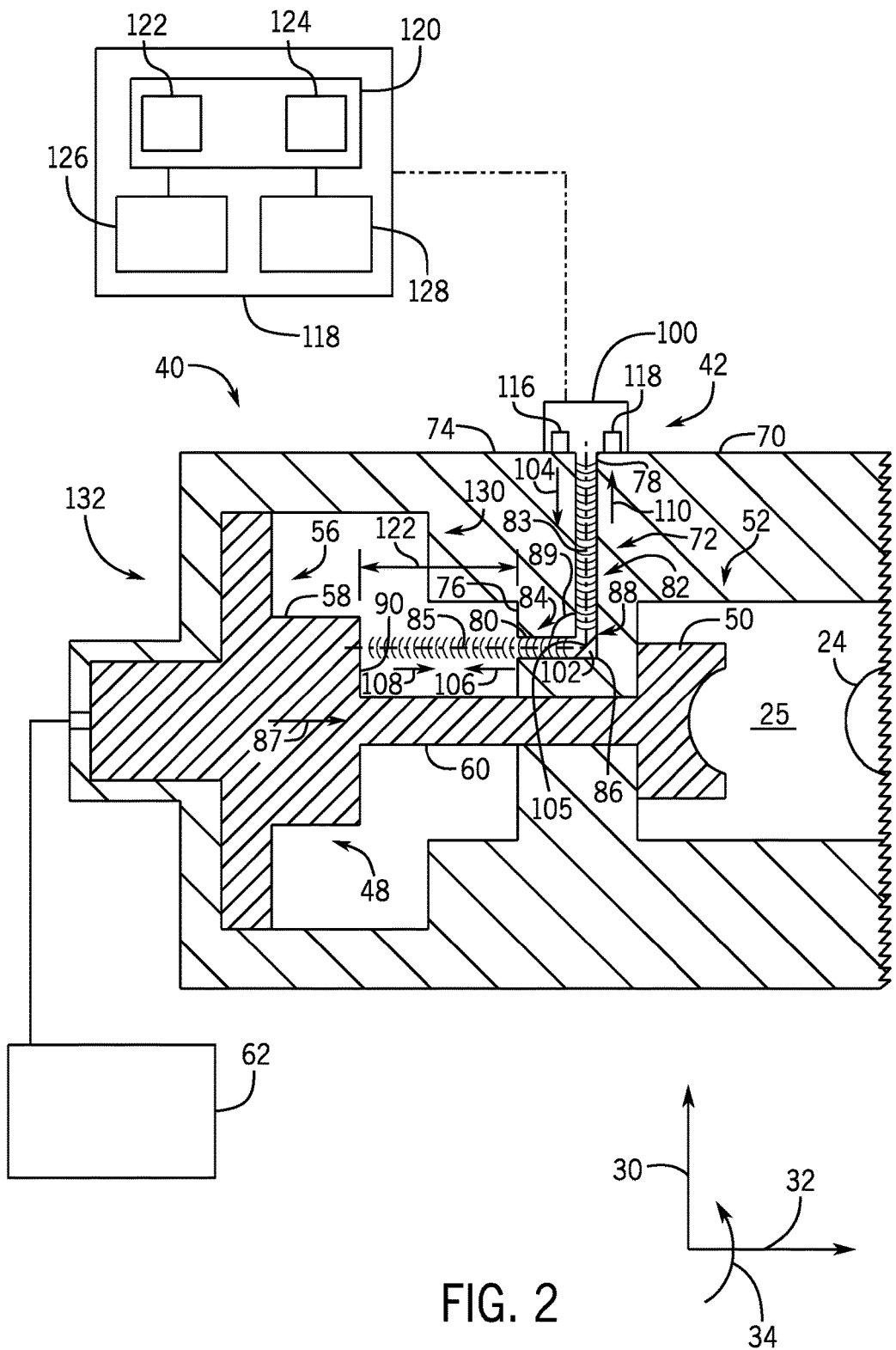
FIG. 2 is schematic diagram of an embodiment of the monitoring system and a portion of the BOP of FIG. 1, wherein a ram of the BOP is in an open position.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to BOP monitoring systems and methods. More particularly, the present embodiments are directed to systems and methods that utilize a monitoring system having a transceiver (e.g., ultrasonic transceiver) and a reflector (e.g., acoustic mirror) to monitor a position of a movable component of a BOP, such as a ram or an actuator of the BOP. To facilitate discussion, certain embodiments disclosed herein include an ultrasonic transceiver configured to emit and to receive acoustic waves and an acoustic mirror configured to reflect acoustic waves. However, it should be understood that the transceiver may be any suitable type of transceiver having any of a variety of emitters, detectors, sensors (e.g., non-contact sensors) or the like, and the reflector may be any suitable type of reflector configured to reflect the corresponding wave. For example, the monitoring system may include an optical emitter to emit light and an optical detector to receive the light, and the reflector may be an optical mirror configured to reflect the light. As discussed in more detail below, components (e.g., the transceiver and/or the reflector) of the monitoring system may be placed on an open side of an actuator of the BOP and/or at various locations of limited size about the BOP, for example.

With the foregoing in mind, FIG. 1 is an embodiment of an offshore system 10. The offshore system 10 includes an offshore vessel or platform 12 at a sea surface 14. A BOP stack 16 is mounted to a wellhead 18 at a sea floor 20. A tubular drilling riser 22 extends from the platform 12 to the BOP stack 16. The riser 22 may return drilling fluid or mud toward the platform 12 during drilling operations. Downhole operations are carried out by a tubular string 24 (e.g., drill string or production tubing string) that extends from the platform 12, through the riser 22, through a bore 25 of the BOP stack 16, and into a wellbore 26.

To facilitate discussion, the BOP stack 16 and its components may be described with reference to a radial axis or direction 30, an axial axis or direction 32, and a circumferential axis or direction 34. As shown, the BOP stack 16 includes multiple BOPs 40 (e.g., ram BOPs) stacked relative to one another. As discussed in more detail below, each BOP 40 includes a pair of axially opposed rams and corresponding actuators that actuate and drive the rams toward and away from one another along the axial axis 32. Although four BOPs 40 are shown, the BOP stack 16 may include any suitable number of BOPs (e.g., 1, 2, 3, 4, 5, 6, 7, 8, 9, 10 or more). Additionally, the BOP stack 16 may include any of a variety of different types of rams. For example, in certain embodiments, the BOP stack 16 may include one BOP 40 having opposed shear rams or blades configured to sever the tubular string 24 and seal off the wellbore 26 from the riser 22 and one or more BOPs 40 having opposed pipe rams configured to engage the tubular string 24 and to seal the bore 25 (i.e., the annulus around the tubular string 24 disposed within the bore 25). As discussed in more detail below, a monitoring system 42 may be provided to monitor a position (e.g., along the axial axis 32) of a movable component (e.g., a ram and/or an actuator) of the BOP 40.

Figure 3:
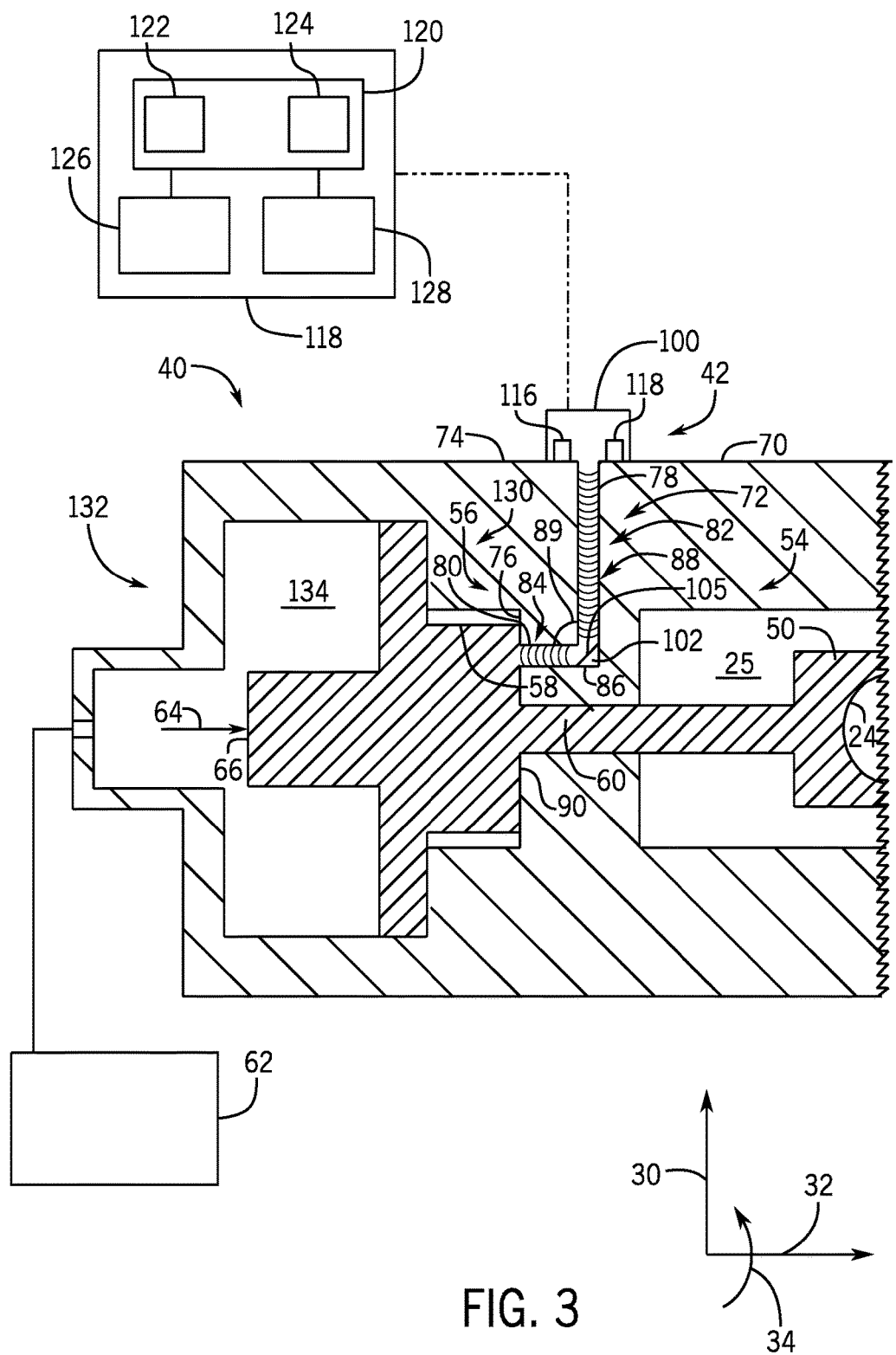
FIG. 3 is a schematic diagram of an embodiment of the monitoring system and the portion of the BOP of FIG. 2, wherein the ram of the BOP is in a closed position.

FIGS. 2 and 3 are schematic diagrams of the monitoring system 42 and a portion of the BOP 40. In FIG. 2, a ram 50 of the BOP 40 is in an open position 52 (e.g., first position). In the open position 52, each ram 50 is withdrawn from the bore 25, does not contact the tubular string 24, and/or does not contact a corresponding opposed ram 50. In FIG. 3, the ram 50 of the BOP 40 is in a closed position 54 (e.g., second position). In the closed position 54, the ram 50 extends into the bore 25, contacts the tubular string 24, and/or contacts a corresponding opposed ram 50.

As shown in FIGS. 2 and 3, an actuator 56 includes a piston 58 and a connecting rod 60, which extends between the piston 58 and the ram 50. In operation, the actuator 56 is configured to actuate and drive (e.g., cause translation of, or cause linear and/or axial movement without rotation) the ram 50 along the axial axis 32 between the open position 52 and the closed position 54. For example, in certain embodiments, a fluid (e.g., gas or liquid) from a fluid source 62 (e.g., accumulator system) may be provided to exert a force 64 on a first axially-facing surface 66 of the piston 58 to drive the piston 58, the connecting rod 60, and the attached ram 50 along the axial axis 32, thereby moving the ram 50 from the open position 52 to the closed position 54.

As shown, the BOP 40 includes a body 70 (e.g., housing or support structure) surrounding the actuator 56, the ram 50, and/or the bore 25. To facilitate discussion, the body 70 is shown as a one-piece structure; however, as discussed in more detail below, the body 70 may include a bonnet, a bolted flange, a cylinder, a housing, and/or other physically separate components that are coupled (e.g., via fasteners, such as threaded fasteners) to one another. As shown, a channel 72 (e.g., cavity or passageway) is formed within the body 70. In certain embodiments, the channel 72 may extend between a first surface 74 (e.g., outer surface, annular surface, laterally-facing surface, or radially-outer surface) of the body 70 and a second surface 76 (e.g., actuator-facing surface or axially-facing surface) of the body 70. In particular, a first end 78 of the channel 72 may be located at and open to the first surface 74 and a second end 80 of the channel 72 may be located at and open to the second surface 76.

In the illustrated embodiment, the channel 72 includes a first portion 82 and a second portion 84 that are joined to one another at a turn 86 (e.g., bend or corner) to form a continuous acoustic path 88 through the body 70. As shown, the first portion 82 extends between the first end 78 and the turn 86, and the first portion 82 has a first central axis 83 that extends in a first direction (e.g., the radial direction 30, at an angle relative to a direction of travel 87 of the actuator 56, and/or generally perpendicular to a direction of travel 87 of the actuator 56). As shown, the second portion 84 extends between the second end 80 and the turn 86, and the second portion 84 has a second central axis 85 that extends in a second direction (e.g., the axial direction 32 and/or generally parallel to the direction of travel 87 of the actuator 56). As shown, the second central axis 85 of the second portion 84 is generally perpendicular to a reflective surface 90 (e.g., axially-facing surface) of the piston 58. It should be understood that the reflective surface 90 may be any suitable surface of the piston 58 or component that moves with the piston 58 (e.g., a protrusion, extension, or attachment to the piston 58). In the illustrated embodiment, the first central axis 83 of the first portion 82 and the second central axis 85 of the second portion 84 are generally perpendicular to one another (i.e., an angle 89 is an approximately 90 degree angle). However, it should be understood that the angle 89 may be any suitable angle, such as between approximately 45 to 135, 60 to 110, or 75 to 95 degrees, for example.

In certain embodiments, the monitoring system 42 includes a transceiver 100 (e.g., ultrasonic transceiver) configured to transmit acoustic waves (e.g., ultrasound waves) and a reflector 102 (e.g., acoustic mirror) configured to reflect the acoustic waves. In the illustrated embodiment, the transceiver 100 is positioned on the first surface 74 of the body 70 and at the first end 78 of the channel 72 to enable the transceiver 100 to transmit the acoustic waves into the channel 72 and to receive reflected acoustic waves from the channel 72. In the illustrated embodiment, the reflector 102 is positioned within the channel 72 and includes a reflective surface 105 configured to reflect and/or to redirect the acoustic waves between the transceiver 100 and the piston 58. The reflector 102 may be formed from any suitable material configured to reflect acoustic waves, including stainless steel, inconnel, crystal, quartz, glass, aluminum, silicon, plastics, or any combination thereof.

As shown, the reflector 102 is positioned at the turn 86 between the first portion 82 and the second portion 84 of the channel 72. As noted above, in the illustrated embodiment, the first portion 82 and the second portion 84 of the channel 72 are generally perpendicular to one another. Accordingly, the reflector 102 is an approximately 45 degree reflector configured to reflect the acoustic waves approximately 90 degrees to facilitate transmission of the acoustic waves between the transceiver 100 and the piston 58. It should be understood that the channel 72 and the reflector 102 may have any of a variety of configurations (e.g., the angle 88 between the portions 82, 84 of the channel 72 may be any suitable angle, as noted above, and the reflective surface 105 of the reflector 102 may have any suitable corresponding angle or orientation) to facilitate transmission of acoustic waves between the transceiver 100 and the piston 58. Furthermore, in some embodiments, the channel 72 may include multiple portions and multiple turns, and multiple reflectors 102 may be provided to redirect the acoustic wave through the channel 72 between the transceiver 100 and the piston 58. Such a configuration may enable the monitoring system 42 to be utilized in a variety of BOP's 40 and/or at a variety of locations about the BOP 40.

In operation, the transceiver 100 is configured to emit an acoustic wave in a first direction into the first portion 82 of the channel 72, as shown by arrow 104. The reflector 102 reflects the acoustic wave in a second direction into the second portion 84 of the channel 72, as shown by arrow 106. The acoustic wave is then reflected by the reflective surface 90 of the piston 58 in a third direction back toward the reflector 102, as shown by arrow 108. The reflector 102 then reflects the acoustic wave in a fourth direction back toward the transceiver 100, as shown by arrow 110, which is configured to generate a signal based on the received reflected acoustic wave.

As shown, the monitoring system 42 may include a control system 118 having a controller 120 (e.g., electronic controller) having electrical circuitry configured to process signals and/or to provide control signals to certain components of the monitoring system 42 and/or the BOP 40. For example, the controller 120 may be configured to provide a drive signal to drive the transceiver 100 to emit an acoustic wave and may be configured to process the signal generated by the transceiver 100 in response to the received reflected acoustic wave to determine a position of the actuator 56 (e.g., along the axial axis 32), which is also indicative of and can be utilized to determine a position of the attached ram 50. A distance 122 between the second end 80 of the channel 72 and the second axially-facing surface 90 of the piston 58 and a corresponding time of flight (e.g., a time between emission of the acoustic wave and detection of the reflected acoustic wave at the transceiver 100) vary as the ram 50 moves between the open position 52 and the closed position 54. Thus, the controller 120 may determine the position of the actuator 58 based at least in part on the time of flight.

In some embodiments, the monitoring system 42 may also include other types of sensors, such as a temperature sensor 116 configured to generate a signal indicative of a temperature and/or a pressure sensor 118 configured to generate a signal indicative of a pressure. In some embodiments, the temperature sensor 116 and/or the pressure sensor 118 may be located within or proximate to the transceiver 100 and may be configured to measure the temperature and/or the pressure within the channel 72 and/or other region of the BOP 40. A velocity of the acoustic wave generally varies with temperature and/or pressure, and thus, the controller 120 may determine the position of the piston 58 based on the time of flight and the velocity of the acoustic waves as a function of the temperature and/or the pressure. It should be understood that the monitoring system 42 may include any of a variety of other types of sensors to monitor properties of the fluid, such as a type of fluid, viscosity, density, dielectric constant, or the like, within the channel 72 and/or other regions of the BOP 40, and that respective signals from such sensors may be utilized by the controller 120 to determine the position of the piston 58.

In the illustrated embodiment, the controller 120 includes a processor, such as the illustrated microprocessor 122, and the memory device 124. The controller 120 may also include one or more storage devices and/or other suitable components. The processor 122 may be used to execute software, such as software for controlling the various components of the monitoring system 42. Moreover, the processor 122 may include multiple microprocessors, one or more "general-purpose" microprocessors, one or more special-purpose microprocessors, and/or one or more application specific integrated circuits (ASICS), or some combination thereof. For example, the processor 122 may include one or more reduced instruction set (RISC) or complex instruction set (CISC) processors.

The memory device 124 may include a volatile memory, such as random access memory (RAM), and/or a nonvolatile memory, such as ROM. The memory device 124 may store a variety of information and may be used for various purposes. For example, the memory device 124 may store processor-executable instructions (e.g., firmware or software) for the processor 122 to execute, such as instructions for controlling the transceiver 100 and/or other components of the monitoring system 42. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, temperature data, pressure data, fluid property data, or the like), instructions (e.g., software or firmware for controlling the transceiver 100, processing signals, or the like), and any other suitable data.

As noted above, the controller 120 may be configured to provide control signals to various components of the monitoring system 42 and/or the BOP. For example, in certain embodiments, the controller 120 may be configured to control the actuator 56 to adjust a position of the respective ram 50. The controller 120 may be configured to control the actuator 56 automatically based on well conditions (e.g., well pressure), and/or based on an operator input received via a user input 126 (e.g., a switch, button, or the like), for example. The user input 126 may be part of a user interface that includes a display 128. In some embodiments, the user input 126 may be a virtual user input (e.g., displayed on a touch screen of the display 128) configured to receive the operator input. In some embodiments, the controller 120 may instruct the display 128 to provide an output indicative of the position of the ram 50, for example.

In some embodiments, the controller 120 may be configured to provide the drive signal to the transceiver 100 in response to a current position of the ram 50, well conditions (e.g., well pressure), based on the operator input, and/or during and/or after adjustment of the actuator 56 (e.g., during and/or after the control signal is provided to the actuator 56). In some embodiments, the controller 120 may be configured to provide the drive signal to the transceiver 100 continuously, periodically, or at predetermined intervals (e.g., every 0.25, 0.5, 0.75, 1, 10, 30, 60, 90, 180, 240, 300 or more minutes). In some embodiments, the controller 120 may be configured to provide the drive signal to the transceiver 100 at a first predetermined interval when the ram 50 is in the open position 52 and to provide the drive signal to the transceiver 100 at a second predetermined interval when the ram 50 is in the closed position 54. In some embodiments, the second predetermined interval is shorter than the first predetermined interval to provide relatively frequent confirmation or feedback that the ram 50 is maintained in the closed position 54. In some embodiments, the controller 120 may be configured to provide the drive signal to the transceiver 100 at a predetermined time (e.g., 1, 2, 3, 4, 5, 10, or more minutes) after a control signal is provided to the actuator 56 and/or during movement of the ram 50. For example, the controller 120 may provide the drive signal to the transceiver 100 at the predetermined time after the control signal is provided to the actuator 56 to drive the ram 50 to the closed position 54 to confirm that the ram 50 is moving toward and/or reaches the closed position 54.

It should be understood that, in certain embodiments, the control system 118 may be a distributed control system with one or more controllers (e.g., electronic controllers with processors, memory, and instructions) distributed about the drilling and production system and in communication with one another to receive and/or to process the signals from one or more transceivers 100, to provide an output, and/or to control the components of the monitoring system 42 and/or the BOP 40. In some embodiments, one controller may be positioned at a subsea location (e.g., at the BOP 40) and another controller may be positioned at a surface location (e.g., at the platform 12). In some embodiments, the controller 120 having the processor 122 that is configured to provide the drive signals to the transceiver 100 and/or to process the signals from the transceiver 100 may be housed at a subsea location (e.g., at the BOP 40), and the user input 126 and the display 128 may be housed at a surface location (e.g., at the platform 12), and the various components may be communicatively coupled to one another via control lines or umbilicals.

As shown, the actuator 56 comprises an open side 130 and a closed side 132. When fluid is provided on the open side 130 of the actuator 56, the fluid drives the actuator 56 into the open position 52. When fluid is provided on the closed side 132 of the actuator 56, the fluid drives the actuator 56 into the closed position 54. Advantageously, the channel 72 (e.g., the second end 80 of the channel 72) is positioned on the open side 130 of the actuator 56. Such a configuration may enable monitoring the position of the actuator 56 and/or the ram 50 without creating a leak path on the closed side 132 of the actuator 56. Placement of a channel on the closed side 132 of the actuator 56 creates a potential leak path on the closed side 132 of the actuator 56 and increases the possibility that the fluid may escape from a chamber 134 and reduce the force 64 on the actuator 56, thereby causing the ram 50 to move from the closed position 54 toward the open position 52. The disclosed configuration enables the channel 72, the transceiver 100, and/or the reflector 102 to be positioned on the open side 130 of the actuator 56, and during a kick event or other time when the ram 50 should be in the closed position 54, the rams 50 may remain in the closed position 54 and any fluid that leaks through the channel 72 or other portion of the monitoring system 42 would not cause the rams 50 to move from the closed position 54 toward the open position 52.

Figure 4:
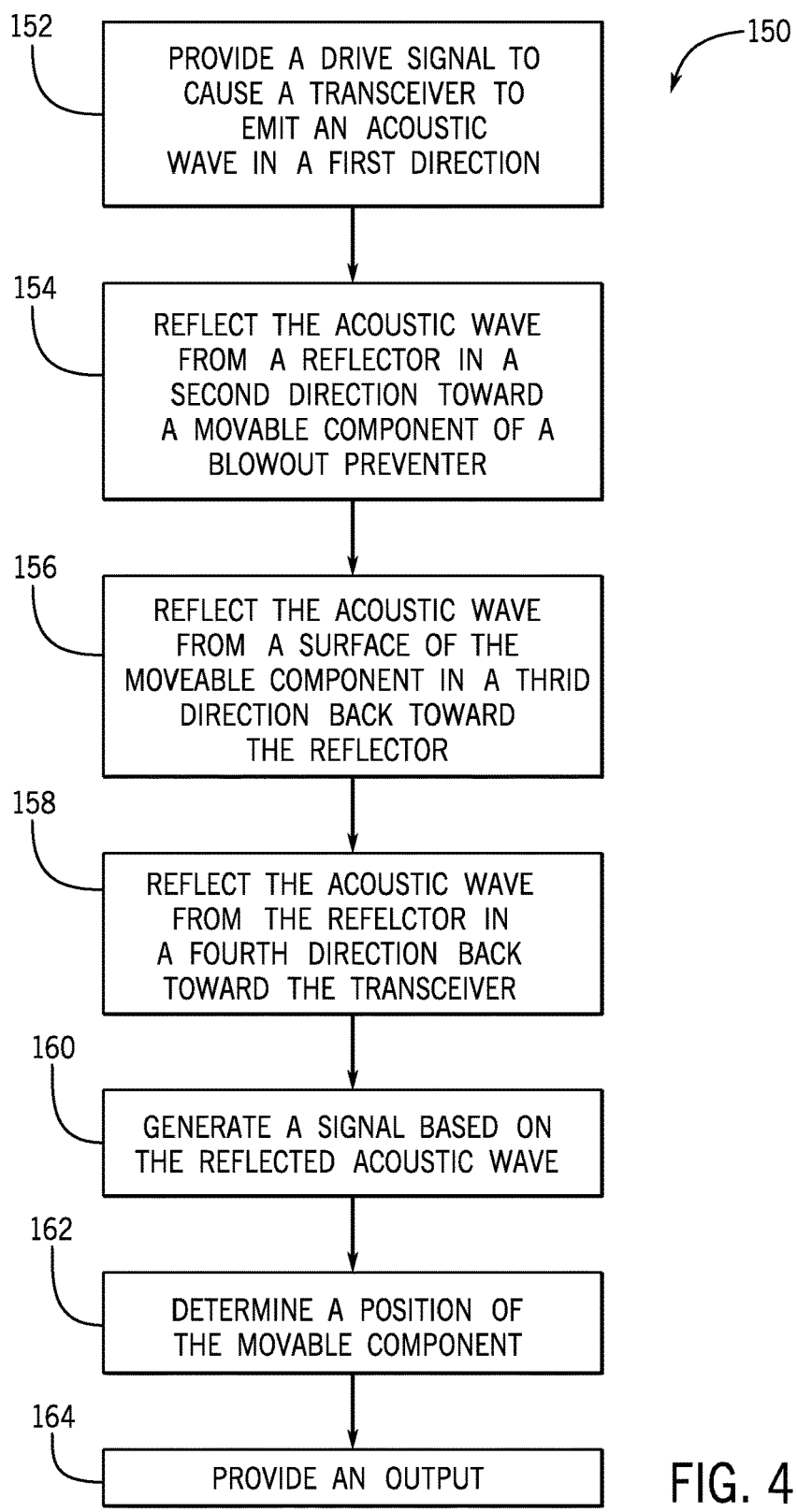
FIG. 4 is a flow diagram of a method of using the monitoring system of FIG. 1, in accordance with an embodiment of the present disclosure.

FIG. 4 is a flow chart illustrating a method 150 for monitoring a position of a movable component (e.g., the ram 50 and/or the actuator 56) of the BOP 40, in accordance with the present disclosure. The method 150 includes various steps represented by blocks. It should be noted that the method 150 may be performed as an automated procedure by a system, such as the monitoring system 42. Although the flow chart illustrates the steps in a certain sequence, it should be understood that the steps may be performed in any suitable order and certain steps may be carried out simultaneously, where appropriate. Further, certain steps or portions of the method 150 may be performed by separate devices. For example, a first portion of the method 150 may be performed by the processor 122, while a second portion of the method may be performed by any device, such as another processing device or the reflector 102. As noted above, the methods for monitoring movable components of the BOP stack 16 may be initiated automatically (e.g., following a control signal to drive the rams 50 or according to a predetermined interval) and/or in response to operator input (e.g., via the user input 126).

As shown, the method 150 may begin with the controller 120 providing a drive signal to cause the transceiver 100 to emit an acoustic wave, in step 152. As discussed above with respect to FIGS. 2 and 3, the transceiver 100 may be positioned at the first end 78 of the channel 72 and may emit the acoustic wave in a first direction into the first portion 82 of the channel 72 toward the reflector 102. In step 154, the reflector 102 may reflect and/or redirect the acoustic wave in a second direction toward the actuator 56. As discussed above with respect to FIGS. 2 and 3, the reflector 102 may be positioned within the channel 72, such as proximate to the turn 86 of the channel 72, and may reflect the acoustic wave into the second portion 84 of the channel 72 toward the actuator 56. The reflective surface 105 of the reflector 102 may be oriented at any suitable angle and have any suitable configuration to reflect acoustic waves between the transceiver 100 and the actuator 56.

In step 156, the reflective surface 90 of the actuator 56 may reflect the acoustic wave in a third direction back toward the reflector 102. In step 158, the reflector 102 may reflect and/or redirect the acoustic wave in a fourth direction back toward the transceiver 100. In step 160, the transceiver 100 may receive the reflected acoustic wave and may generate a signal based on the received reflected acoustic wave that is indicative of a position of the actuator 56 and the respective ram 50.

In step 162, the controller 120 may process the signal to determine the position of the actuator 56 and the respective ram 50. As discussed above with respect to FIGS. 2 and 3, the distance 122 between the second end 80 of the channel 72 and the reflective surface 90 of the actuator 56 varies as the ram 50 moves between the open position 52 and the closed position 54. Accordingly, the controller 120 may determine the position by calculating the time of flight of the acoustic wave. As noted above, in some embodiments, the controller 120 may determine the position based on additional inputs, such as the temperature and/or the pressure within the channel 72 and/or properties of the fluid within the channel 72, for example. In step 164, the controller 120 may provide an output (e.g., a visual and/or audible output) indicative of the position of the actuator 56 and the respective ram 50. For example, the controller 120 may instruct the display 128 to provide an image, a graphical display, and/or a text message indicating that the ram 50 is in the open position 52, the closed position 54, or a position therebetween. In some embodiments, the controller 120 may be configured to provide a visual and/or audible alarm if the position of the ram 50 is outside of a target or desired position (e.g., the ram 50 is not fully closed following an instruction or control signal to close the ram 50).

Figure 5:
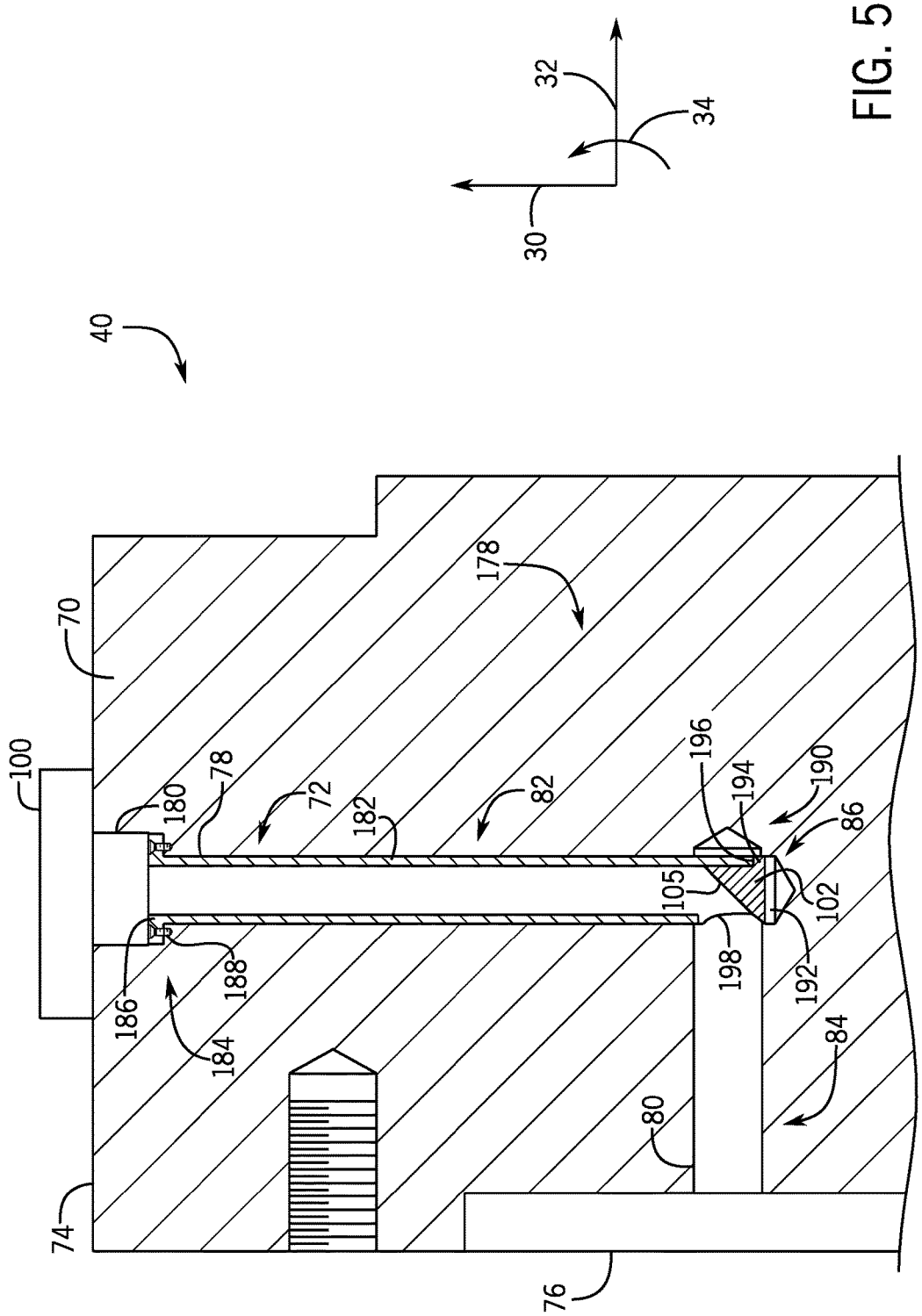
FIG. 5 is cross-sectional side view of a reflector assembly that may be used in the monitoring system of FIG. 1, in accordance with an embodiment of the present disclosure.

FIG. 5 is a cross-sectional side view of a reflector assembly 178 positioned within the channel 72 formed in the body 70 of the BOP 40, in accordance with an embodiment of the present disclosure. As shown, the reflector assembly 178 includes the reflector 102, which is positioned at the turn 86 between the first portion 82 and the second portion 84 of the channel 72. The reflector assembly 178 also includes a cylinder 182 (e.g., tube, pipe, or annular structure) that is configured to support the reflector 102 and to be positioned within the first portion 82 of the channel 72. In the illustrated embodiment, a first end 184 of the cylinder 182 includes a flange 186 that is configured to be coupled to the body 70 via one or more fasteners 188 (e.g., threaded fasteners), and a second end 190 of the cylinder 182 is positioned at the turn 86 of the channel 72 and extends about at least a portion of the reflector 102. In some embodiments, the reflector 102 is mounted on a plate 192 (e.g., via a fastener, adhesive, interference fit, key/slot interface, or the like), which may be configured to be coupled to the second end 190 of the cylinder 182 (e.g., via a fastener, such as a threaded fastener).

In some embodiments, the reflector 102 may include a protrusion 194 (e.g., key) that may fit within or engage a slot 196 (e.g., extending about a portion of a circumference of the cylinder 182) to facilitate proper orientation and/or alignment of the reflector 102 within the cylinder 182. As shown, the cylinder 182 includes an opening 198 (e.g., hole or passageway) to enable transmission of the acoustic waves between the first end 78 and the second end 80 of the channel 72. The cylinder 182 may support and/or protect the reflector 102 and/or facilitate installation and/or retrieval of the reflector 102 within the channel 72, for example. The transceiver 100 may be mounted on the outer surface 74 of the body 70 of the BOP 16 and/or may be supported within a recess 180 and/or a portion of the channel 72 formed in the body 70.

Figure 6:
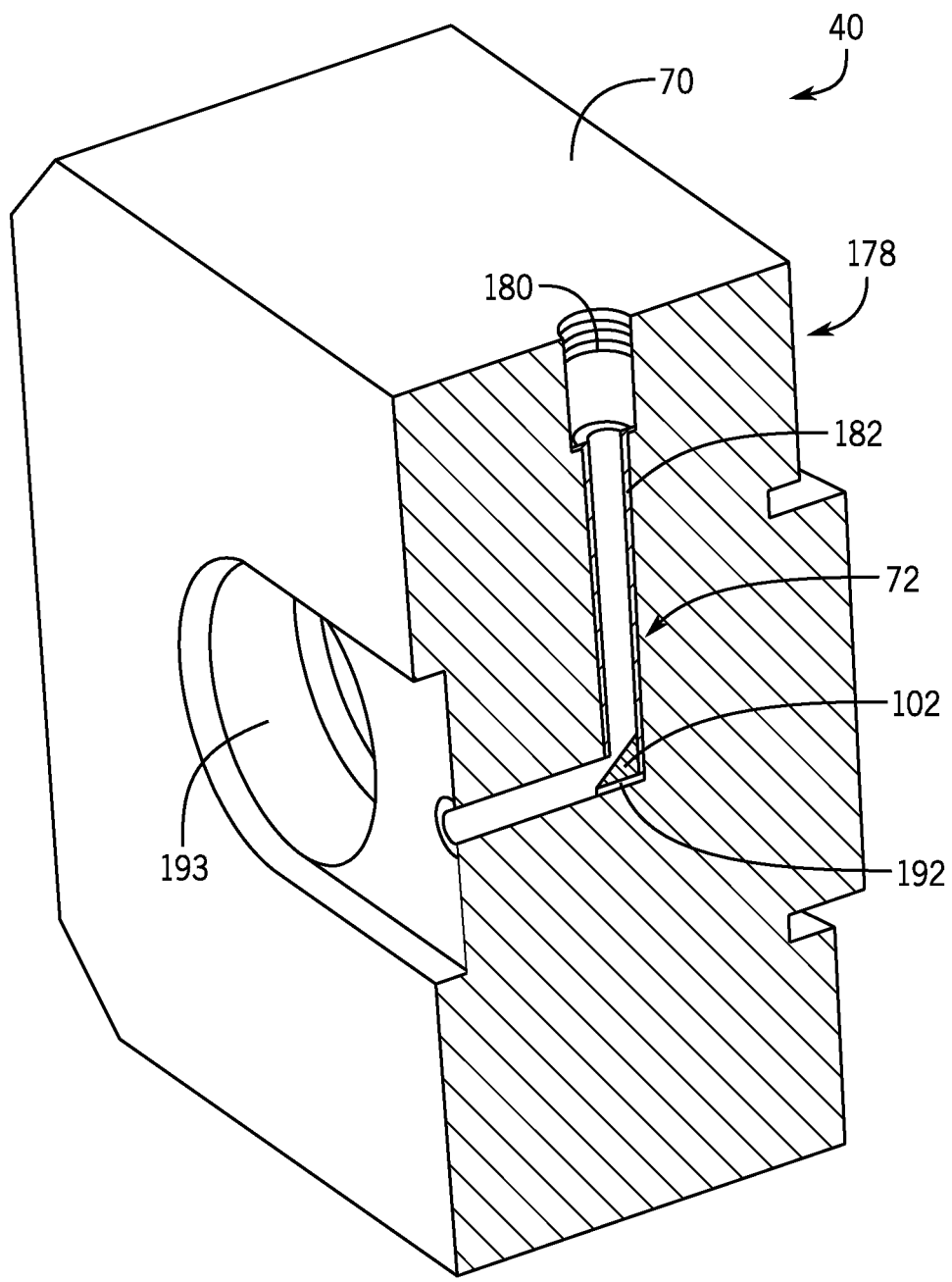
FIG. 6 is a cross-sectional perspective view of the reflector assembly of FIG. 5, in accordance with an embodiment of the present disclosure.
Figure 6:
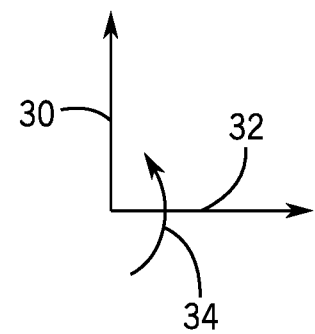

FIG. 6 is a cross-sectional perspective view of the reflector assembly 178 positioned within the channel 72 formed in the body 70 of the BOP 40. As shown, the body 70 includes the recess 180, which may be configured to receive and/or to support the transceiver 100. The cylinder 182 is positioned within the channel 72 and supports the reflector 102 mounted on the plate 192. In certain embodiments, the body 70 may include at least one opening 193 that is configured to receive a fastener, which may couple the body 70 to another component of the BOP 40. For example, the body 70 may be a bonnet, and the opening 193 may be configured to receive a fastener to couple the body 70 to a bolted flange. In some embodiments, multiple openings 193 may be positioned at discrete locations about the circumference of the body 70, and the channel 72 may be positioned in a portion of the body 70 between adjacent openings 193 along the circumferential axis 34.

Figure 7:
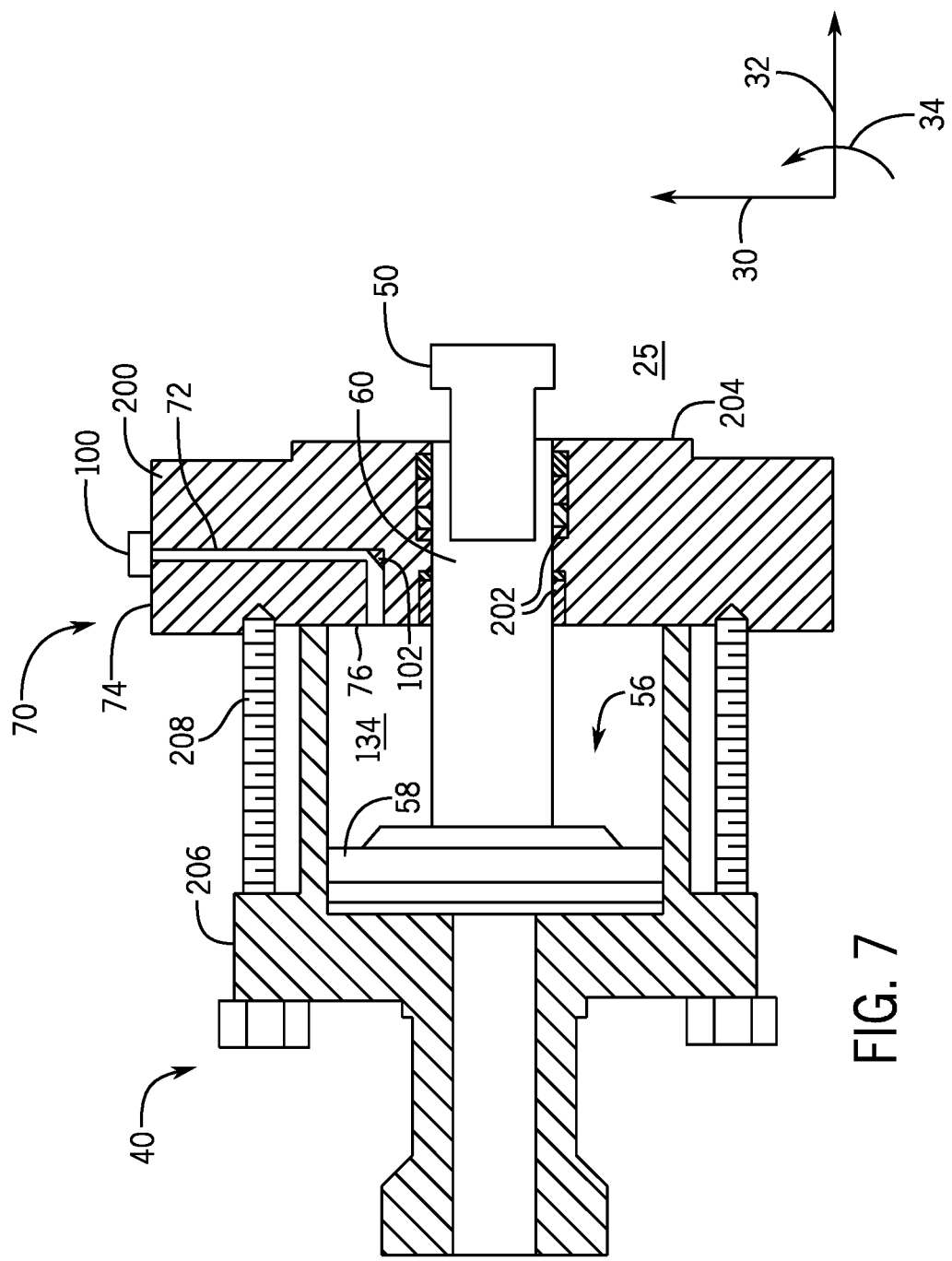
FIG. 7 is a cross-sectional side view of a portion of a BOP having the monitoring system of FIG. 1, in accordance with an embodiment of the present disclosure.

As noted above, FIGS. 2 and 3 illustrate the body 70 as a one-piece structure to facilitate discussion. However, it should be understood that the body 70 may include a bonnet, a bolted flange, a cylinder, a housing, and/or other physically separate components that are coupled to one another, and that the channel 72 may be formed in any suitable component of the BOP 40. For example, FIG. 7 is a cross-sectional side view of the monitoring system 42 and a portion of the BOP 40, wherein the channel 72 is formed in a bonnet 200 of the BOP 40. As shown, the bonnet 200 circumferentially surrounds the connecting rod 60 of the actuator 56 and is positioned between the ram 50 and piston 58 and/or between the bore 25 and the chamber 134 (e.g., the chamber 134 housing the piston 58 and/or through which the piston 58 moves) along the axial axis 32 of the BOP 40. In some embodiments, the bonnet 200 includes a first axially-facing surface 204 that is open to the bore 25, that directly contacts the fluid within the bore 25, and/or that is configured to be coupled to a body of the BOP 40 that houses the ram 50 and/or that defines the bore 25, and/or the second surface 76 that is open to the chamber 134 and/or that directly contacts the piston 58 when the ram 50 is in a closed position 54. In some embodiments, the bonnet 200 includes or supports one or more seals 202 (e.g., annular seals) that are configured to seal against the connecting rod 60, thereby isolating the bore 25 from the chamber 134. As shown, the bonnet 200 is coupled to a flange 206 (e.g., bolted flanged) via one or more fasteners 208 (e.g., threaded fasteners, such as bolts). The flange 206 may support the actuator 56 and/or components (e.g., valves) that are utilized to actuate the actuator 56 and drive the ram 50 between the open position 52 and the closed position 54.

Figure 8:
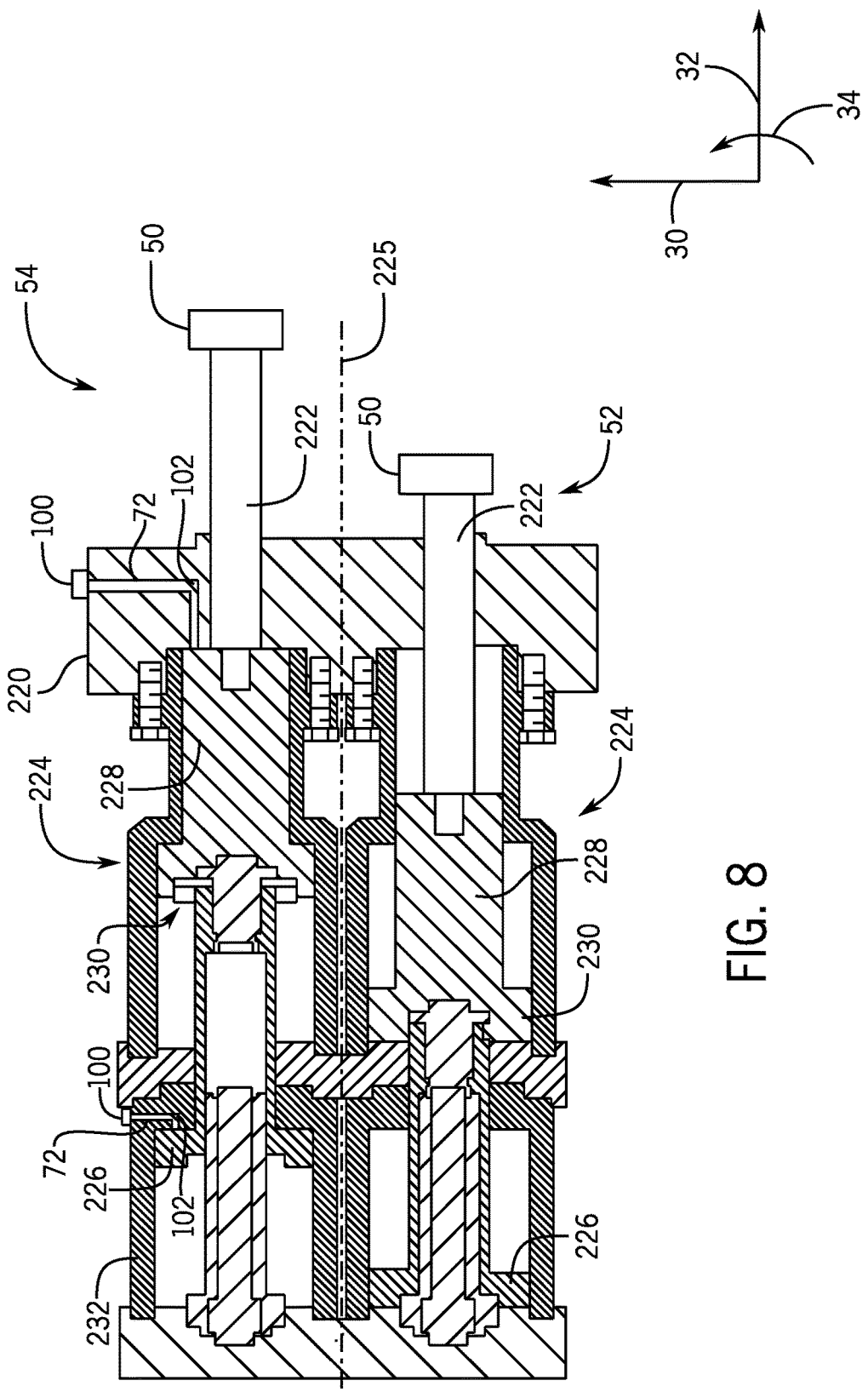
FIG. 8 is a cross-sectional side view of a portion of another type of BOP having the monitoring system of FIG. 1, in accordance with an embodiment of the present disclosure.

FIG. 8 is a cross-sectional side view of the monitoring system 42 and another type of BOP 40 having a bonnet 220, in accordance with an embodiment of the present disclosure. In particular, the BOP 40 includes the bonnet 220 that supports and/or circumferentially surrounds respective connecting rods 222 of multiple actuators 224. To facilitate discussion, FIG. 8 includes one actuator 224 and corresponding ram 50 below a central axis 225 in the open position 52 and one actuator 224 and corresponding ram 50 above the central axis 225 in the closed position 54. In operation, both actuators 224 and corresponding rams 50 may move together (e.g., simultaneously) along the axial axis 32 between the open position 52 and the closed position 54.

As shown, each actuator 224 includes a first piston 226 and a second piston 228 that are coupled to one another (e.g., via a coupling 230, which may include fasteners, such as threaded fasteners). In such cases, the monitoring system 42 may be configured to monitor the position of one or both of the first piston 226 and/or the second piston 228. For example, as shown, the channel 72 may be formed in a housing 232 (e.g., annular housing) that circumferentially surrounds the first piston 226 and is positioned between the first piston 226 and the second piston 228 along the axial axis 32 to transmit acoustic waves toward the first piston 226 to monitor the position of the first piston 226. Additionally or alternatively, the channel 72 may be formed in the bonnet 220 positioned between the second piston 228 and the ram 50 along the axial axis 32 to transmit acoustic waves toward the second piston 228 to monitor the position of the first piston 228.

Figure 9:
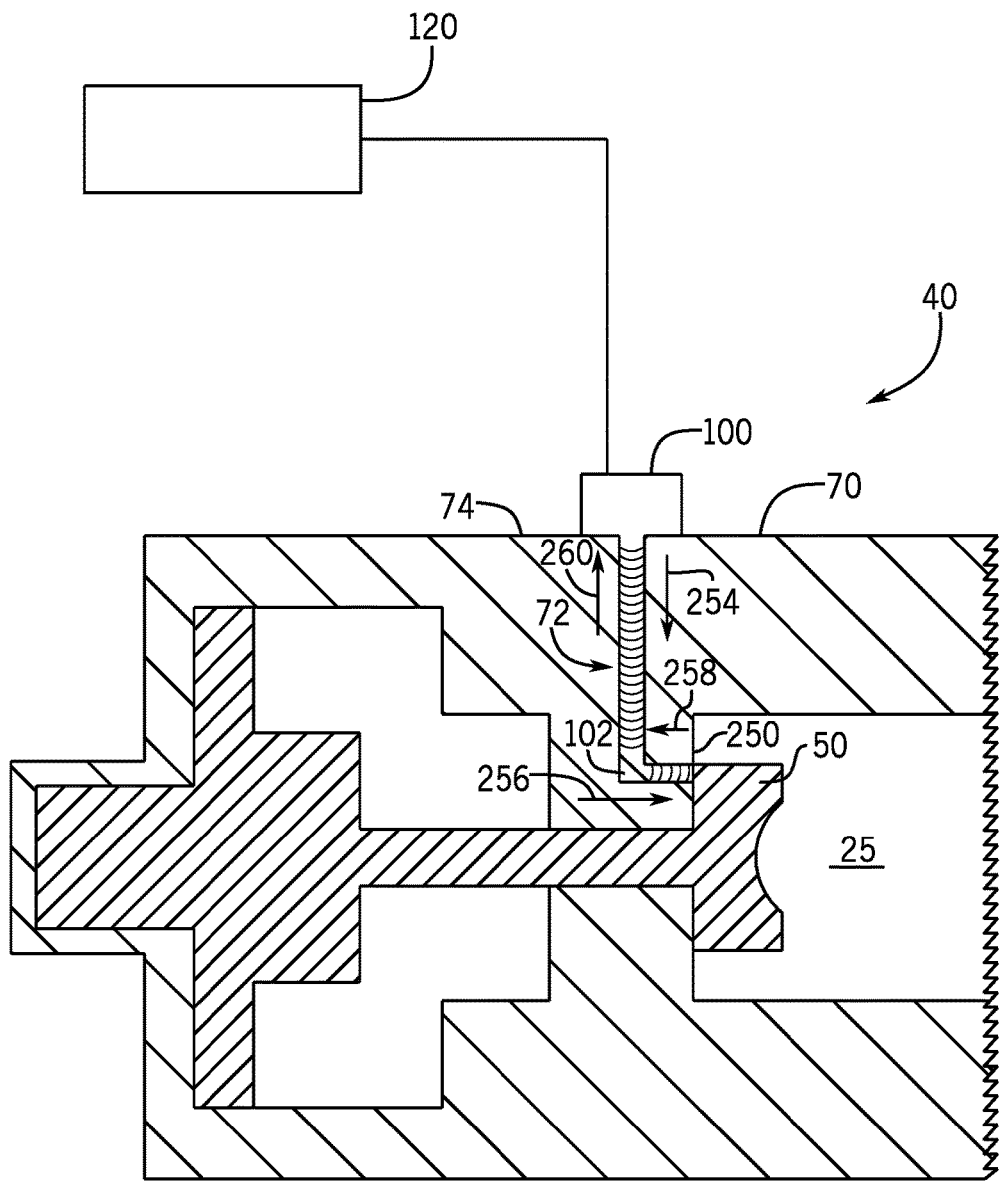
FIG. 9 is a schematic diagram of an embodiment of the monitoring system and a portion of the BOP of FIG. 1, wherein the monitoring system is configured to directly monitor a position of a ram of the BOP.
Figure 9:
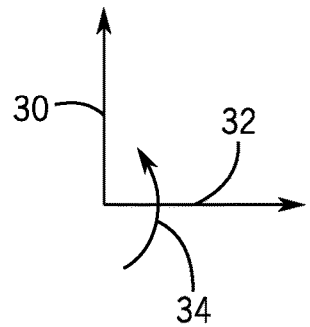

As noted above, the monitoring system 42 may be positioned on the open side 130 and/or at various locations of limited size about the BOP 40. For example, in some embodiments, the monitoring system 42 may be configured to transmit acoustic waves toward the ram 50 to directly monitor the position of the ram 50 (e.g., the acoustic waves emitted by the transceiver 100 may pass into the bore 25 and/or be directly reflected by the ram 50). With the foregoing in mind, FIG. 9 is a schematic diagram of the monitoring system 42 configured to directly monitor the position of the ram 50. As shown, the channel 72 is formed in the body 70 and extends from the first surface 74 to a third surface 250 (e.g., an axially-facing surface or a bore-facing surface) of the body 70. The reflector 102 is positioned within the channel 72 and is configured to reflect acoustic waves between the transceiver 100 and the ram 50. Thus, in operation, the transceiver 100 emits the acoustic waves in a first direction toward the reflector 102, as shown by arrow 254, the reflector 102 reflects the acoustic waves in a second direction toward the ram 50, as shown by arrow 256, a reflective surface 252 (e.g., axially-facing surface) of the ram 50 reflects the acoustic waves in a third direction back toward the reflector 102, as shown by arrow 258, and the reflector 102 reflects and/or redirect the acoustic waves in a fourth direction back toward the transceiver 100, as shown by arrow 260. The transceiver 100 may generate a signal indicative of the position of the ram 50, and the controller 120 may process the signal to determine the position of the ram 50 and/or to provide an output indicative of the position of the ram 50 in the manner set forth above.

It should be understood that any of the features shown or described with respect to FIGS. 1-9 may be combined in any suitable manner. For example, in some embodiments, the monitoring system 42 may include multiple channels 72, transceivers 100, and/or reflectors 102 to monitor multiple movable components of the BOP 40, such as to directly monitor respective positions of both the actuator 56 and the ram 50. Furthermore, certain embodiments described herein refer to offshore (e.g., subsea) mineral extraction systems; however, it should be understood that the monitoring system may be utilized in any BOP stack assembly within any of a variety of onshore (e.g., land-based) or offshore mineral extraction systems. Additionally, the monitoring system may be utilized within various other components of mineral extraction systems, such as within any of a variety of valves, such as gate valves, choke valves, check valves, ball valves, or the like, to monitor a position of a respective movable component of the valve.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A monitoring system for a blowout preventer (BOP), comprising:
    an ultrasonic transceiver configured to be coupled to a body that houses a movable component of the BOP;
    a reflector removably coupled to a cylinder that is configured to be positioned within a channel formed in the body, wherein the ultrasonic transceiver is configured to emit an acoustic wave and the reflector is configured to reflect the acoustic wave to transmit the acoustic wave from the ultrasonic transceiver to the movable component of the BOP and to transmit a reflected acoustic wave from the movable component to the ultrasonic transceiver to enable the ultrasonic transceiver to generate a first signal indicative of a position of the movable component; and
    a controller configured to receive the first signal from the ultrasonic transceiver, to determine the position of the movable component based on the first signal and to instruct the ultrasonic transceiver to emit the acoustic wave at a predetermined time interval that is determined based on the position of the movable component.

2. The system of claim 1, wherein the reflector is a 45 degree acoustic reflector that is configured to reflect the acoustic wave and the reflected acoustic wave approximately 90 degrees.

3. The system of claim 1, wherein the controller is configured to provide an output indicative of the position of the movable component of the BOP.

4. The system of claim 1, wherein the controller is configured to provide a drive signal to cause the ultrasonic transceiver to emit the acoustic wave.

5. A blowout preventer (BOP) system, comprising:
    a body that houses a movable component of the BOP, the body comprising a channel comprising an open end that is open to an exterior surface of the body;
    an ultrasonic transceiver coupled to the exterior surface of the body or positioned within the channel proximate to the open end of the channel; and
    a reflector positioned within the channel formed in the body, wherein the ultrasonic transceiver is configured to emit an acoustic wave in a first direction into the channel toward the reflector, the reflector is configured to reflect the acoustic wave in a second direction through the channel toward the movable component of the BOP and to reflect a reflected acoustic wave from the movable component back to the ultrasonic transceiver to enable the ultrasonic transceiver to generate a first signal indicative of a position of the movable component;
    wherein the ultrasonic transceiver emits the acoustic wave at a predetermined time interval that is determined based on the position of the movable component.

6. The system of claim 5, wherein the channel and the reflector are positioned on an open side of an actuator that is configured to drive a ram of the BOP.

7. The system of claim 5, wherein the reflector is configured to reflect the acoustic wave and the returned acoustic wave approximately 90 degrees.

8. The system of claim 5, wherein the body circumferentially surrounds a connector arm extending between a piston and a ram of the BOP.

9. The system of claim 5, wherein the reflector is positioned between a piston and a ram of the BOP along an axial axis of the BOP.

10. The system of claim 5, wherein the movable component comprises a ram of the BOP.

11. The system of claim 5, wherein the movable component comprises a piston of an actuator that is configured to drive a ram of the BOP.

12. The system of claim 5, wherein the first direction is approximately perpendicular to a direction of travel of the movable component, and the second direction is approximately parallel to the direction of travel of the movable component.

13. The system of claim 5, wherein a portion of the channel positioned between the reflector and the movable component comprises a central axis that is approximately perpendicular to a reflective surface of the movable component that is configured to reflect the acoustic wave to generate the reflected acoustic wave.

14. The system of claim 5, wherein the reflector is positioned within a cylinder that is removably coupled to the body and is positioned within the channel.

15. A method for monitoring a blowout preventer (BOP), the method comprising:
    emitting, using a transceiver, an acoustic wave into a first portion of a channel and toward a reflector positioned within the channel, wherein the channel is formed in a body configured to house a movable component of the BOP, the channel comprises an open end that is open to an exterior surface of the body, and the transceiver is coupled to the exterior surface of the body or positioned within the channel proximate to the open end of the channel;
    reflecting, using the reflector, the acoustic wave through a second portion of the channel toward the movable component of the BOP;
    reflecting, using the reflector, a returned acoustic wave from the movable component of the BOP back toward the transceiver;
    determining, using a processor, a position of the movable component based on a time between emission of the acoustic wave by the transceiver and receipt of the returned acoustic wave at the transceiver; and
    providing a drive signal to cause the transceiver to emit the acoustic wave using the processor periodically at a first predetermined interval when the movable component is disposed in a first position and providing the drive signal periodically at a second predetermined interval when the movable component is disposed in a second position.

16. The method of claim 15, comprising instructing a display to provide a displayed output indicative of the position of the movable component using the processor.

17. The method of claim 15, comprising reflecting the acoustic wave approximately 90 degrees using the reflector.

* * * * *